(12) United States Patent
Schulz et al.

(10) Patent No.: US 8,192,639 B2
(45) Date of Patent: Jun. 5, 2012

(54) REFLECTION-REDUCING INTERFERENCE LAYER SYSTEM AND METHOD FOR PRODUCING IT

(75) Inventors: Ulrike Schulz, Jena (DE); Peter Munzert, Jena (DE); Norbert Kaiser, Jena (DE)

(73) Assignee: Fraunhofer-Gesellschaft zur Foerderung der Angewandten Forschung E. V., Munich (DE)

( * ) Notice: Subject to any disclaimer, the term of this patent is extended or adjusted under 35 U.S.C. 154(b) by 0 days.

(21) Appl. No.: 12/892,362

(22) Filed: Sep. 28, 2010

(65) Prior Publication Data

US 2011/0051246 A1 Mar. 3, 2011

Related U.S. Application Data

(63) Continuation of application No. PCT/EP2009/054253, filed on Apr. 8, 2009.

(30) Foreign Application Priority Data

Apr. 15, 2008 (DE) .................. 10 2008 018 866

(51) Int. Cl.
*B29D 11/00* (2006.01)
(52) U.S. Cl. ............................ 216/24; 216/67
(58) Field of Classification Search ............ 216/24, 216/67
See application file for complete search history.

(56) References Cited

U.S. PATENT DOCUMENTS

| 4,340,276 | A | * | 7/1982 | Maffitt et al. | 359/581 |
| 5,437,894 | A | * | 8/1995 | Ogawa et al. | 427/535 |
| 6,210,858 | B1 | | 4/2001 | Yasuda et al. | |
| 7,229,686 | B2 | | 6/2007 | Yoshikawa et al. | |
| 2003/0087102 | A1 | | 5/2003 | Yamaya et al. | |
| 2003/0185973 | A1 | * | 10/2003 | Crawley et al. | 427/162 |
| 2005/0233083 | A1 | | 10/2005 | Schulz et al. | |
| 2007/0020404 | A1 | | 1/2007 | Seiberle et al. | |
| 2007/0035053 | A1 | | 2/2007 | Schulz et al. | |
| 2007/0121211 | A1 | | 5/2007 | Watanabe et al. | |
| 2008/0002259 | A1 | | 1/2008 | Ishizawa et al. | |

FOREIGN PATENT DOCUMENTS

| DE | 102 41 708 A1 | 3/2004 |
| DE | 103 18 586 A1 | 11/2004 |
| EP | 0 989 443 A2 | 3/2000 |
| EP | 1 022 587 A1 | 7/2000 |
| EP | 1 403 665 A2 | 3/2004 |
| EP | 1 791 002 A1 | 5/2007 |

OTHER PUBLICATIONS

Kaless, A., et al., "NANO-motheye Antireflection Pattern by Plasma Treatment of Polymers," Surface & Coatings Technology, Science Direct, 2005, 4 pages, Elsevier.

Schulz, U., et al., "Procedures to Reduce Reflection on Polymer Surfaces," Advancements in Polymer Optics Design, Fabrication, and Materials, Proceedings of SPIE, 2005, 10 pages, vol. 5872, SPIE, Bellingham, WA.

Schulz, U., et al., "New Plasma Processes for Antireflective Structures on Plastics," Proceedings of SPIE, 2008, 6 pages, vol. 7101, SPIE.

* cited by examiner

*Primary Examiner* — Shamim Ahmed
(74) *Attorney, Agent, or Firm* — Slater & Matsil, L.L.P.

(57) ABSTRACT

A reflection-reducing interference layer system is disclosed, which has at least three alternating layers having different refractive indices. At least one nanostructured layer comprising an organic material or an organic-inorganic hybrid material is applied to the alternating layers. With the interference layer system, it is possible to obtain very low reflection over a wide wavelength and incident angle range.

18 Claims, 7 Drawing Sheets

REFLECTION-REDUCING INTERFERENCE LAYER SYSTEM AND METHOD FOR PRODUCING IT

This application is a continuation of co-pending International Application No. PCT/EP2009/054253, filed Apr. 8, 2009, which designated the United States and was not published in English, and which claims priority to German Application No. 10 2008 018 866.2, filed Apr. 15, 2008, both of which applications are incorporated herein by reference.

TECHNICAL FIELD

The invention relates to a reflection-reducing interference layer system and a method for producing it.

BACKGROUND

For the antireflection coating of surfaces, in particular of optical elements or displays, use is usually made of reflection-reducing interference layer systems containing a plurality of alternating layers composed of high refractive index and low refractive index materials. $MgF_2$ with n=1.38 is currently used as material having a particularly low refractive index in the visible spectral range. The antireflection effect of conventional dielectric layer systems could be improved if materials having a lower refractive index were available.

The document EP 1791002 A1 discloses binding particles of $MgF_2$ into amorphous silicon oxide in order to obtain a layer having an even lower refractive index.

Furthermore, the document EP 1403665 A2 describes binding hollow nanoparticles into an inorganic silicon oxide layer in order to produce a layer having a particularly low refractive index.

An alternative possibility for reducing the reflection of an optical element is known from the German patent document 10241708 B4. In this method, a nanostructure is produced at the surface of a plastic substrate by means of a plasma etching process, the reflection of the plastic substrate being reduced by the nanostructure. The antireflection structuring of an optical element by producing a nanostructure at the surface of the element has the advantage of obtaining low reflection over a wide incident angle range.

SUMMARY OF THE INVENTION

The production of nanostructures by means of a plasma etching method can be employed in the case of plastic surfaces, for example, composed of PMMA or other thermoplastics and also soft resists, but cannot readily be employed for harder materials.

Broadband antireflection coatings which are to the greatest possible extent independent of the light incident angle, however, also would be desirable for materials such as glass or quartz, for example, which cannot readily be nanostructured by means of a plasma etching method.

One aspect of the invention is an improved reflection-reducing interference layer system which is distinguished by low reflection over a wide wavelength and incident angle range and, in particular, can also be used on materials such as glass or quartz. A further aspect is to specify a comparatively simple and cost-effective method for producing the system.

In accordance with one embodiment of the invention, a reflection-reducing interference layer system has at least three alternating layers having different refractive indices, wherein at least one nanostructured layer composed of an organic material or an organic-inorganic hybrid material is applied to the alternating layers.

With an interference layer system of this type, it is advantageously possible to obtain particularly low reflection over a wide wavelength range, which is to the greatest possible extent independent of the incident angle of the light. This is based, in particular, on the fact that the nanostructured layer composed of the organic material or the organic-inorganic hybrid material has a porous structure having a very low effective refractive index that could not be obtained with conventional materials for interference layer systems. In particular, the nanostructured layer can have an effective refractive index that is lower than the refractive index n=1.38 of $MgF_2$. In this case, the effective refractive index should be understood to mean the refractive index averaged over the layer, which, on account of the nanostructuring, is lower than that in the case of a homogeneous layer composed of the same material.

Preferably, the nanostructured layer has an effective refractive index n<1.3. Particularly preferably, the refractive index n of the nanostructured layer is even less than 1.25.

The nanostructured layer is preferably nanostructured by means of a plasma etching method. The production of a nanostructure by means of a plasma etching process is known per se from the German patent document 10241708 B4, the disclosure content of which in this regard is hereby incorporated by reference.

The nanostructured layer preferably has a thickness of between 50 nm and 150 nm inclusive. The nanostructure advantageously extends from the surface of the nanostructured layer to a depth of 25 nm or more into the nanostructured layer. Particularly preferably, the nanostructure extends from the surface to a depth of more than 50 nm into the nanostructured layer. It is advantageous for the nanostructure to extend virtually through the entire nanostructured layer. A particularly low effective refractive index of the nanostructured layer is obtained in this way.

The nanostructured layer can be, in particular, a layer produced by plasma polymerization. During the plasma polymerization, vaporous organic precursor compounds are firstly activated by a plasma in a vacuum process chamber. As a result of the activation, ionized molecules arise and first molecular fragments in the form of clusters or chains already form in the gas phase. The subsequent condensation of these fragments on the substrate surface, under the action of substrate temperature, electron bombardment and/or ion bombardment, then brings about the polymerization and thus the formation of a closed layer. Polymers produced in this way are also referred to as plasma polymers. The plasma polymer layer can contain, in particular, hexamethyldisiloxane (HMDSO), allylamine, allyl alcohol, vilyl acetate or styrene.

Furthermore, the nanostructured layer can contain parylene, Ormocer, polyurethane-containing resist, polyamide, polymethyl methacrylate (PMMA), silicone, pentacene or polytetrafluoroethylene (PTFE). Further preferred materials are melamine (2,4,6-triamino-1,3,5-triazine), alpha-NPD (N,N'-(di-naphth-1-yl)-N,N'-diphenylbenzidine), NNB (N,N'-bis(3-methylphenyl)-N,N'-diphenylbenzidine) and TNP(N,N,N',N'-tetraphenylbenzidine).

In a further configuration, the nanostructured layer comprises an organic material into which inorganic nanoparticles are bound.

The nanostructured layer is preferably the covering layer of the interference layer system. In this case, the low refractive index of the nanostructured layer has a particularly advantageous effect since the difference in refractive index with respect to the surrounding medium, for example, air, is reduced in this way, with the result that particularly low reflection of the interference layer system can be obtained.

In order to protect the nanostructured layer against ambient influences, in particular mechanical damage, the nanostructured layer is preferably provided with a protective layer. The protective layer can be an $SiO_2$ layer, for example. Preferably, the protective layer has a thickness of 50 nm or less.

The number of alternating layers of the interference layer system is preferably at least five, particularly preferably at least seven. A high number of alternating layers advantageously makes it possible to obtain particularly low reflection in a large spectral range.

The alternating layers are preferably inorganic layers. In particular, the alternating layers can be oxide layers such as, for example, silicon dioxide, tantalum pentoxide or titanium dioxide. Furthermore, the alternating layers can also contain one or more fluoride or nitride layers.

In the method for producing a reflection-reducing interference layer system in accordance with one configuration of the invention, a plurality, preferably at least three, of alternating layers having different refractive indices are applied to a substrate. Furthermore, a layer composed of an organic material or composed of an organic-inorganic hybrid material is applied and then a nanostructure is produced in the layer composed of the organic material or the organic-inorganic hybrid material by means of a plasma process.

In one preferred embodiment, both the alternating layers and the layer composed of the organic material or the organic-inorganic hybrid material are applied in each case by a vacuum coating method. The alternating layers of the interference layer system can be applied, for example, by conventional vapor deposition, ion-assisted vapor deposition or sputtering. The at least partly organic layer provided for producing the nanostructure is preferably likewise applied by means of a vacuum coating method. In particular, a PVD method such as thermal evaporation, for example, can be used for this purpose. Preferably, the at least partly organic layer in which the nanostructure is intended to be produced is applied by means of plasma polymerization.

Since the subsequent plasma etching process by means of which the at least partly organic layer is structured is also a vacuum process, the entire interference layer system can advantageously be produced in a vacuum process.

Alternatively, however, it is also possible for the layer composed of the organic material or the organic-inorganic hybrid material to be applied by a wet-chemical method and then to be structured by a plasma etching method.

In one preferred embodiment of the method, before the nanostructure is produced in the at least partly organic layer, a thin layer is applied to the at least partly organic layer.

The thin layer can be, for example, an oxide layer, a nitride layer or a fluoride layer. In particular, the thin layer can contain silicon oxide, silicon nitride, titanium oxide, or magnesium fluoride.

The thin layer advantageously has a thickness of just 2 nm or less. Applying this thin layer before carrying out the plasma etching process has the advantage that the thin layer acts as an initial layer for the plasma etching process and thus makes it possible to produce a nanostructure even in materials in which this would be possible only with difficulty or not at all without the prior application of the thin layer.

BRIEF DESCRIPTION OF THE DRAWINGS

The invention is explained in greater detail below on the basis of exemplary embodiments in association with FIGS. 1 to 10.

DETAILED DESCRIPTION OF ILLUSTRATIVE EMBODIMENTS

Identical or identically acting constituent parts are in each case provided with the same reference symbols in the figures. The illustrated constituent parts and also the size relationships of the constituent parts among one another should not be regarded as true to scale.

Figure 1A:
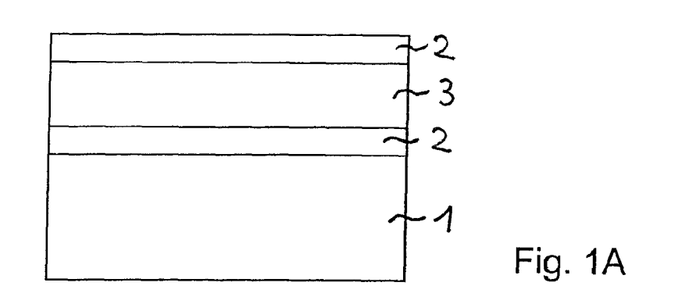
FIGS. 1A to 1E show an exemplary embodiment of a method for producing a reflection-reducing interference layer system on the basis of schematically illustrated intermediate steps.

In the first intermediate step of a method for producing a reflection-reducing interference layer system, as illustrated in FIG. 1A, a plurality of layers 2, 3 having different refractive indices have been applied to a substrate 1. The substrate 1 can be, in particular, an optical element whose surface is intended to be antireflection-coated by the application of a reflection-reducing interference layer system. By way of example, the substrate 1 can be a lens such as, for example, a spectacle lens or the surface of a display.

The substrate 1 can be, in particular, a substrate composed of glass or quartz, but it can also be formed from a plastic. The substrate 1 can have a refractive index of n=1.5, for example.

The layers 2, 3 of the interference layer system preferably have alternately high and low refractive indices. In this case, layers having a low refractive index are understood to be such layers which have a refractive index n≦1.7. Layers having a high refractive index are understood to be such layers which have a refractive index n>1.7, in particular, n>2.0.

In the exemplary embodiment in FIG. 1A, a first layer 2 having a high refractive index, a layer 3 having a low refractive index and a further layer 2 having a high refractive index have been successively applied to the substrate 1.

The layer 3 having a low refractive index can be an $SiO_2$ layer, for example. The layers 2 having a high refractive index can be $TiO_2$ layers, for example.

The alternating layers 2, 3 are preferably applied successively by means of a vacuum coating method. In particular, the layers 2, 3 can be applied by a PVD method such as, for example, conventional evaporation, ion-assisted evaporation or sputtering.

Figure 1B:
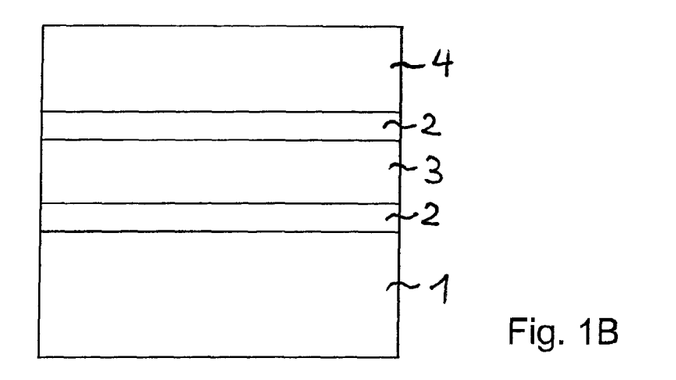

In the intermediate step illustrated in FIG. 1B, a layer 4 composed of an organic material or an organic-inorganic hybrid material has been applied to the alternating layers 2, 3. The at least partly organic layer 4 can contain, in particular, hexamethyldisiloxane (HMDSO), allylamine, allyl alcohol, vilyl acetate, styrene, parylene, Ormocer, polyurethane-containing resist, polyamide, polymethyl methacrylate (PMMA), silicone, pentacene or polytetrafluoroethylene (PTFE). Further suitable materials are melamine (2,4,6-triamino-1,3,5-triazine), alpha-NPD (N,N'-(di-naphth-1-yl)-N,N'-diphenylbenzidine), NNB (N,N'-bis(3-methylphenyl)-N,N'-diphenylbenzidine) and TNP(N,N,N',N'-tetraphenylbenzidine).

The at least partly organic layer 4 is preferably applied by means of a vacuum coating method, like the alternating layers 2, 3 lying underneath. By way of example, a PVD method or a CVD method can be used for applying the at least partly organic layer 4. In particular, the at least partly organic layer 4 can be produced by means of thermal evaporation or by means of a plasma polymerization method.

Alternatively, however, it is also possible for the at least partly organic layer 4 to be applied by means of a wet-chemical method.

Figure 1C:
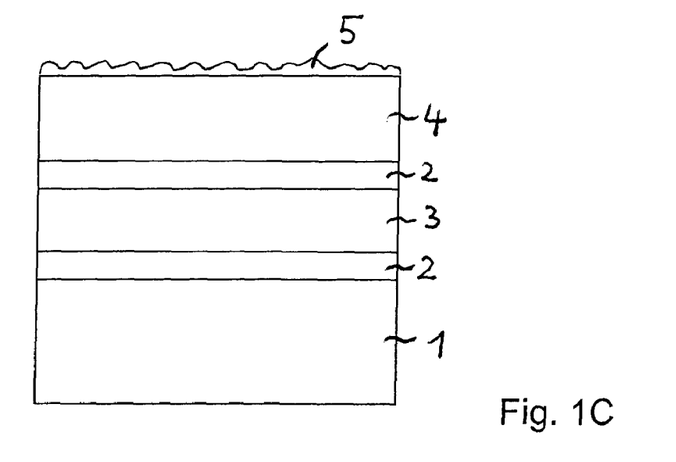

After the at least partly organic layer 4 has been applied, preferably, as illustrated in FIG. 1C, a thin layer 5 is applied, which serves as an initial layer for a subsequent plasma etching process. The thin layer 5 is preferably an oxide layer, an nitride layer or a fluoride layer. In particular, a thin layer 5 composed of $TiO_2$, $SiO_2$, $MgF_2$ or composed of a silicon nitride is suitable.

The thin layer 5 preferably has a thickness of 2 nm or less, particularly preferably of 1.5 nm or less. In the case of such a small thickness, the thin layer is still in the initial stage of its growth and may therefore be non-uniformly thick. The thickness of the thin layer 5 is therefore understood to be a thickness averaged over the thin layer 5. The average thickness of the thin layer 5 can be determined during growth by means of a calibrated oscillating-quartz measurement system, for example, wherein the average layer thickness is calculated from the applied mass. The average thickness of the thin layer 5 corresponds to the thickness of a uniformly thick layer having the same mass as the non-uniformly thick layer actually applied.

Figure 1D:
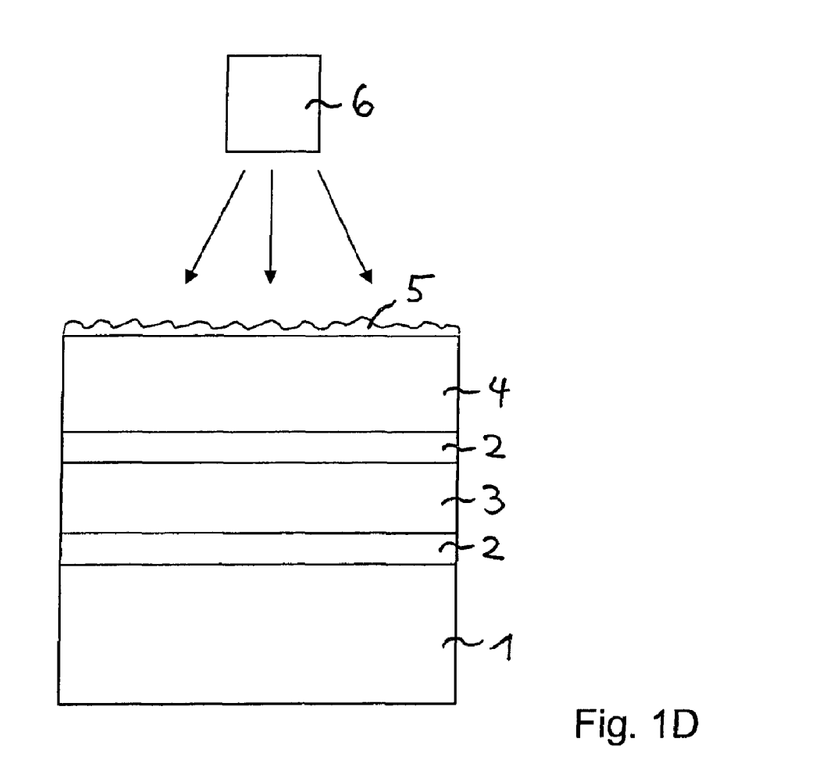

After the thin layer 5 has been applied, as illustrated in FIG. 1D, a plasma etching process is carried out in order to produce a nanostructure in the at least partly organic layer 4. The nanostructure is preferably produced by ion bombardment by means of a plasma ion source 6. In this case, an argon-oxygen plasma can be used, for example. A plasma etching method of this type is known per se from the German patent document 10241708 B4 and will therefore not be explained in any greater detail at this point.

Figure 1E:
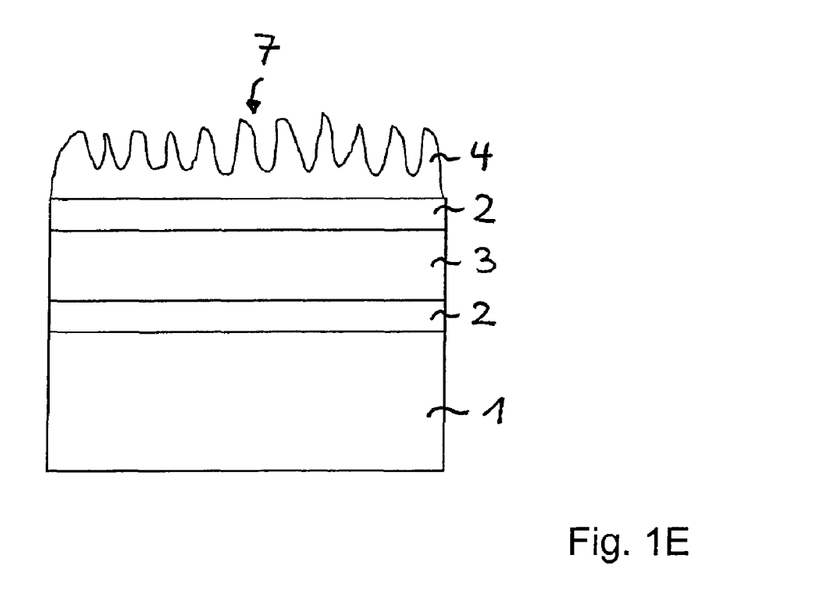

FIG. 1E illustrates the reflection-reducing interference layer system after the production of a nanostructure 7 in the at least partly organic layer 4. The nanostructure 7 advantageously extends from the surface of the at least partly organic layer 4 to a depth of 25 nm or more, preferably of 50 nm or more, into the partly organic layer 4. On account of the nanostructuring, the partly organic layer 4 advantageously has a very low refractive index. Preferably, the refractive index of the at least partly organic layer 4 is n=1.3 or less, particularly preferably n=1.25 or less.

Figure 2:
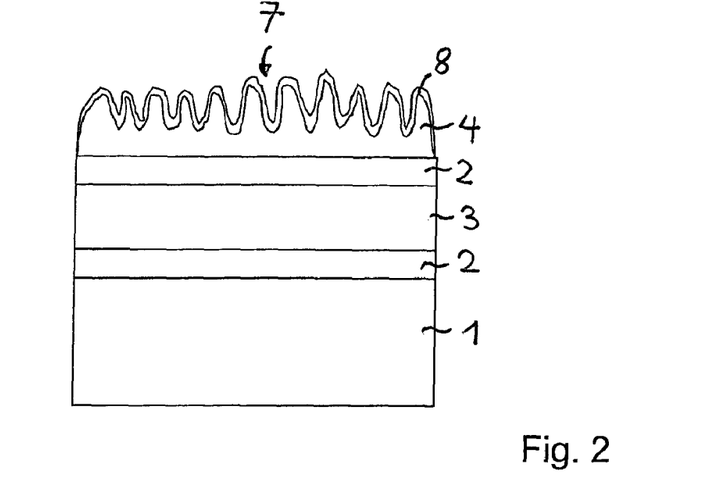
FIG. 2 shows a schematically illustrated cross section through an exemplary embodiment of a reflection-reducing interference layer system according to the invention.

The reflection-reducing interference layer system in accordance with an exemplary embodiment of the invention as illustrated in FIG. 2 substantially corresponds to the exemplary embodiment illustrated in FIG. 1E. It differs from the exemplary embodiment illustrated in FIG. 1E in that a protective layer 8 has additionally been applied to the nanostructure 7 in the partly organic layer 4. The protective layer 8 can be, in particular, a layer composed of $SiO_2$. The protective layer 8 preferably has a thickness of 50 nm or less. The protective layer 8 advantageously protects the nanostructure 7 against external influences, in particular, against mechanical damage.

Figure 3:
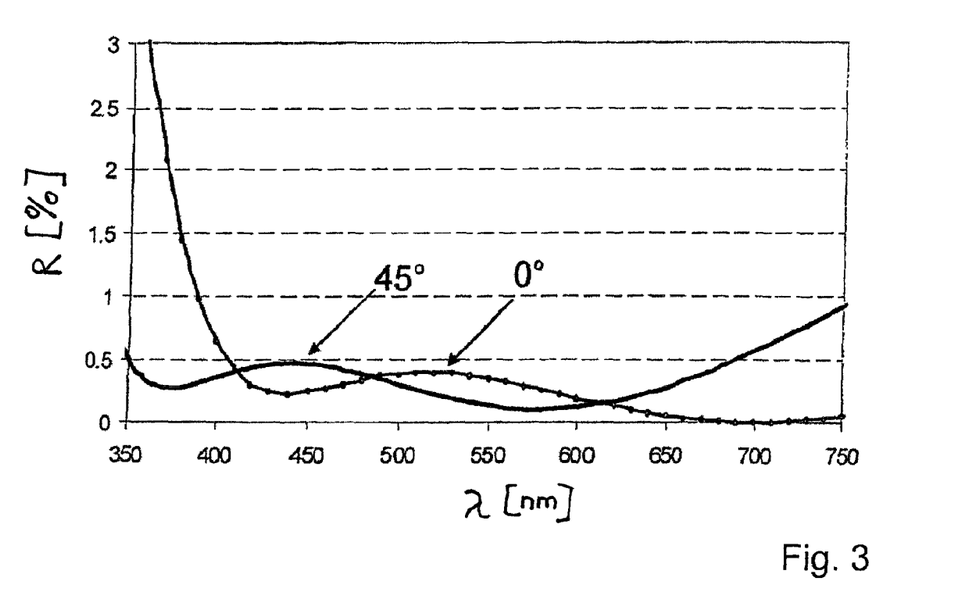
FIG. 3 shows a graphical illustration of the reflection R as a function of the wavelength λ for the incident angles 0° and 45° in an exemplary embodiment of a reflection-reducing interference layer system according to the invention.

FIG. 3 illustrates the reflection R as a function of the wavelength λ in an exemplary embodiment of a reflection-reducing interference layer system according to the invention for the incident angles 0° and 45°. The layer system on which the calculation is based is constructed like the exemplary embodiment illustrated in FIG. 2 and has, proceeding from a substrate having a refractive index n=1.5, the following layer sequence: 5 H, 110 L, 2.5 H, 140 X. Here and hereinafter "H" is used as an abbreviation denoting a layer having a high refractive index (n=2.3) composed of $TiO_2$. The abbreviation "L" denotes a layer having a low refractive index (n=1.46) composed of $SiO_2$. Furthermore, the abbreviation "X" is used to denote a nanostructured layer having an effective refractive index n=1.2. The numbers preceding the letters used as an abbreviation in each case specify the layer thickness in nanometers. FIG. 3 illustrates that with the reflection-reducing interference layer system specified, in the wavelength range of approximately 400 nm to approximately 700 nm, both at an incident angle of 0° and at an incident angle of 45°, in each case a reflection R<0.5% can be obtained.

Figure 4:
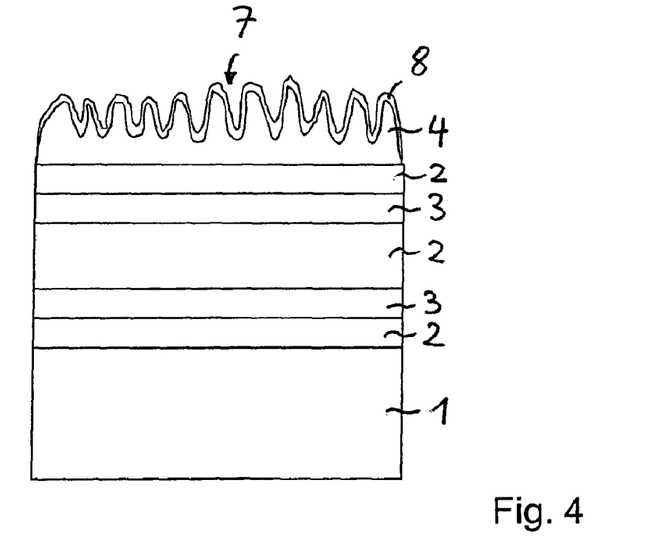
FIG. 4 shows a schematic illustration of a cross section through a further exemplary embodiment of a reflection-reducing interference layer system according to the invention.

The further exemplary embodiment of a reflection-reducing interference layer system according to the invention as illustrated in FIG. 4 has two additional alternating layers in comparison with the exemplary embodiment illustrated in FIG. 2. Proceeding from the substrate 1, the layer system contains a layer 2 having a high refractive index, a layer 3 having a low refractive index, a further layer 2 having a high refractive index, a further layer 3 having a low refractive index, a further layer 2 having a high refractive index, and thereon the nanostructured partly organic layer 4, which is provided with a protective layer 8 like the exemplary embodiment illustrated in FIG. 2. Increasing the number of alternating layers in the reflection-reducing interference layer system has the advantage that the number of optimizable parameters of the layer system increases and it is thus possible to obtain still low reflection in a desired spectral range.

Figure 5:
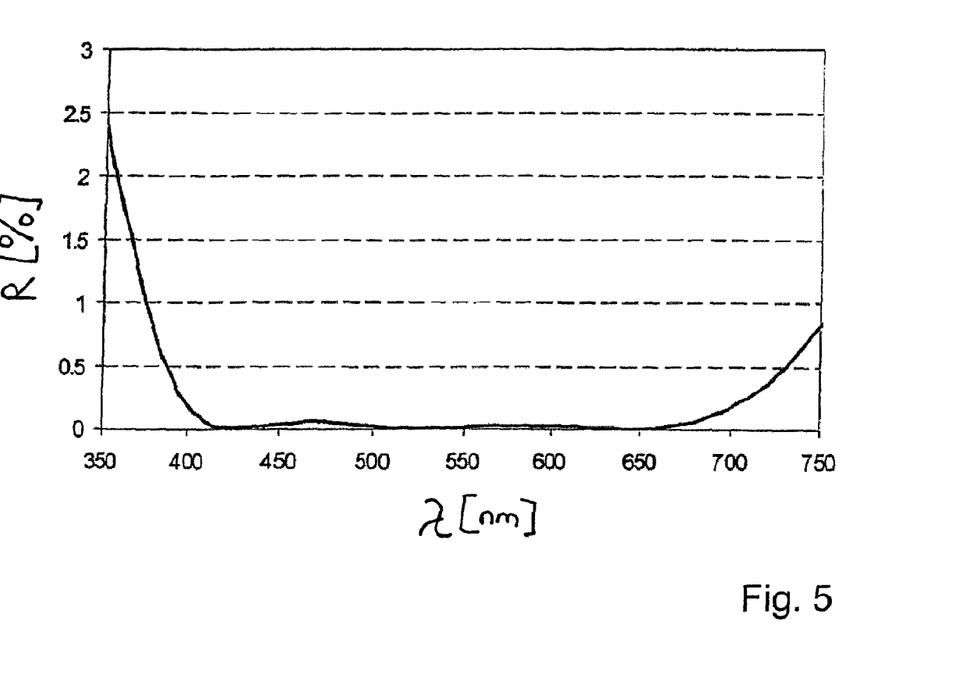
FIG. 5 shows a graphical illustration of the reflection R as a function of the wavelength λ in a further exemplary embodiment of a reflection-reducing interference layer system according to the invention.

FIG. 5 illustrates the reflection R as a function of the wavelength λ for the incident angle 0° in an exemplary embodiment of a reflection-reducing interference layer system which is constructed like the exemplary embodiment illustrated in FIG. 4. The layer system has the following layer construction: 34 H, 32 L, 111 H, 34 L, 11 H, 100 X. In this case, the letters H, L and X used as an abbreviation have the same meaning as in the exemplary embodiment illustrated in FIG. 3, and the numbers preceding the letters specify the layer thickness of the individual layers in nanometers. The profile of the reflection R as illustrated in FIG. 5 illustrates that, in a wavelength range of approximately 400 nm to approximately 700 nm, a reflection R<0.1% can be obtained.

Figure 6:
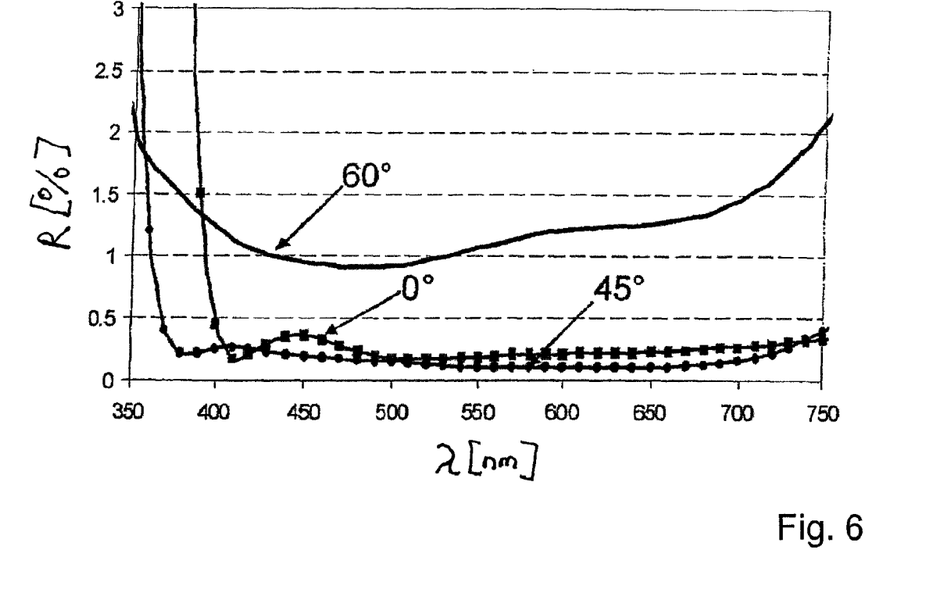
FIG. 6 shows a graphical illustration of the reflection R as a function of the wavelength λ for the incident angles 0°, 45° and 60° in a further exemplary embodiment of a reflection-reducing interference layer system according to the invention.

FIG. 6 illustrates the reflection R as a function of the wavelength λ in a further exemplary embodiment of a reflection-reducing interference layer system. Using the abbreviations as in the previous exemplary embodiments, the layer system has the following layer construction: 9 H, 55 L, 32 H, 29 L, 46 H, 51 L, 16 H, 149 X. The number of alternating layers has therefore been increased again by two layers in comparison with the exemplary embodiment illustrated in FIG. 5. The three curves in FIG. 6, illustrating the reflection for the incident angles 0°, 45° and 60°, illustrate that, with a reflection-reducing interference layer system of this type, for the incident angles in the wavelength range of approximately 400 nm to approximately 700 nm, a reflection R<1.5% can be obtained.

Figure 7:
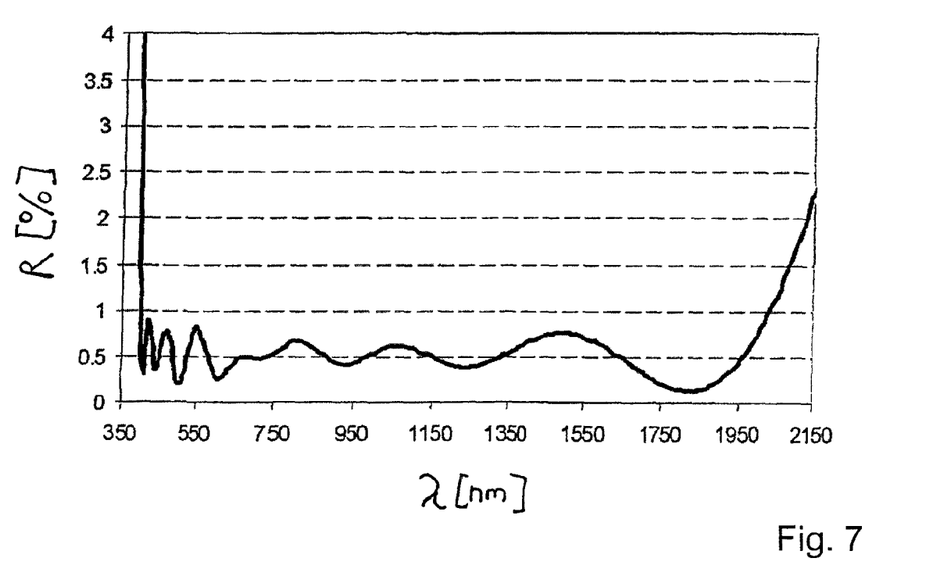
FIG. 7 shows a graphical illustration of the reflection R as a function of the wavelength λ for the incident angle 0° in a further exemplary embodiment of a reflection-reducing interference layer system according to the invention.

FIG. 7 shows a graphical illustration of the reflection R as a function of the wavelength λ for the incident angle 0° in a further exemplary embodiment of a reflection-reducing interference layer system according to the invention. The layer system has a total of thirteen alternating layers and, using the abbreviations already introduced above, has the following layer construction: 9 H, 71 L, 23 H, 46 L, 43 H, 20 L, 171 H, 19 L, 44 H, 46 L, 17 H, 151 L, 140 X. The graph in FIG. 7 illustrates that, with this layer system, in the wavelength range of approximately 400 nm to approximately 2000 nm, at an incident angle of 0°, a reflection of less than 1% can be obtained.

Figure 8:
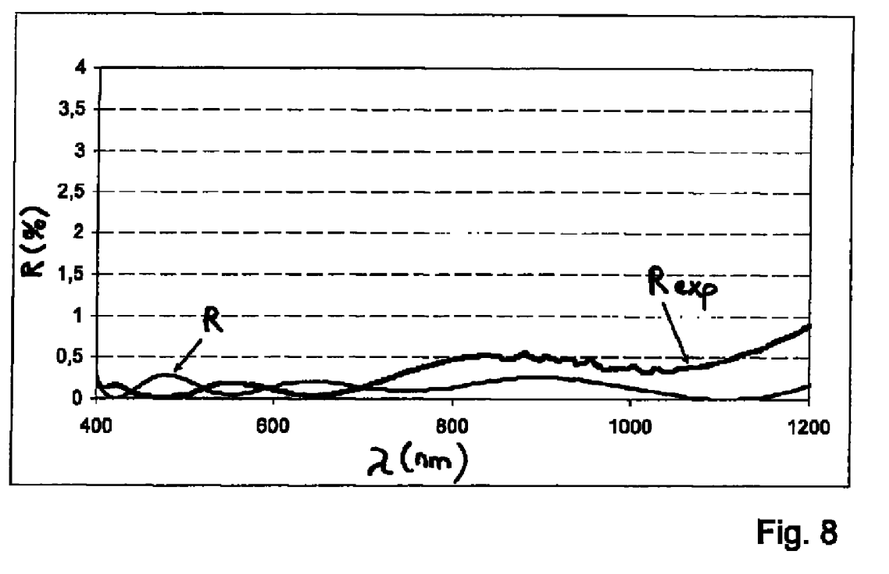
FIG. 8 shows a graphical illustration of the calculated reflection R and the measured reflection $R_{exp}$ as a function of the wavelength λ for the incident angle 0° in a further exemplary embodiment of a reflection-reducing interference layer system according to the invention.

FIG. 8 shows a graphical illustration of the calculated reflection R and the measured reflection $R_{exp}$ as a function of the wavelength λ for the incident angle 0° in a further exemplary embodiment of a reflection-reducing interference layer system according to the invention. The layer system has a total of eight alternating layers and has the following layer construction: 10 H, 62 L, 24 H, 51 L, 28 H, 53 L, 15 H, 280 X. In this case, the abbreviation H denotes a high refractive index layer composed of $Ta_2O_5$ (n=2.3) and the abbreviation L denotes a low refractive index layer composed of $SiO_2$ (n=1.46). X denotes a nanostructured layer composed of PMMA.

In order to produce the layer system, the seven alternating oxide layers H and L were deposited onto a glass substrate by means of vapor deposition successively in a vacuum installation (Leybold APS904 type). The PMMA layer was subsequently applied outside the vacuum chamber from a solution (granules dissolved in methylene chloride) by means of spin-coating with a thickness of approximately 600 nm. Afterward, the sample was transferred into the vacuum installation again and etched there by means of an ion source (Leybold APS type) at a maximum ion energy of 120 eV with addition of oxygen as reactive gas for 500 s. The PMMA layer X remaining after this plasma structuring has a total thickness of 280 nm.

The graph in FIG. 8 illustrates that, with this layer system, in the wavelength range of approximately 400 nm to approximately 1200 nm, at an incident angle of 0°, a reflection of less than 0.5% can be obtained.

Figure 9:
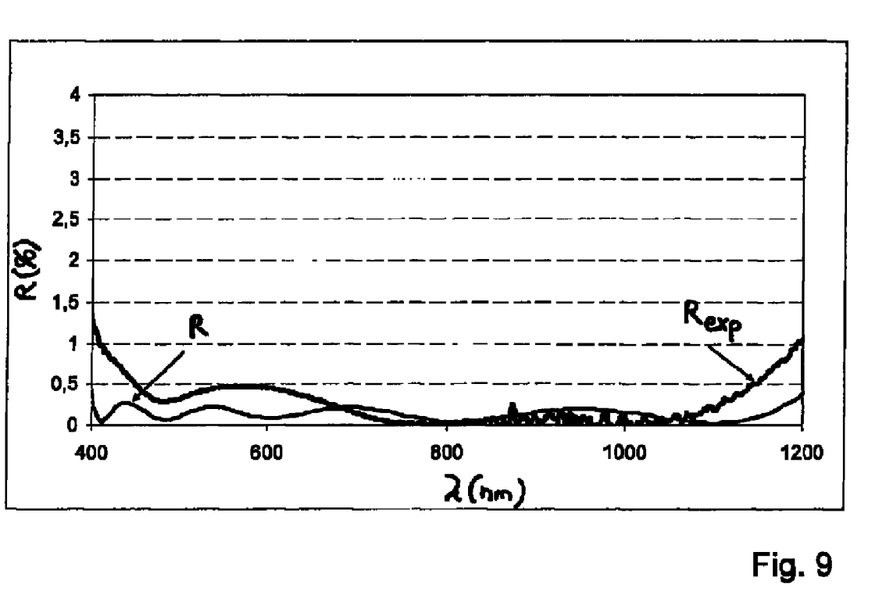
FIG. 9 shows a graphical illustration of the calculated reflection R and the measured reflection $R_{exp}$ as a function of the wavelength λ for the incident angle 0° in a further exemplary embodiment of a reflection-reducing interference layer system according to the invention.

FIG. 9 shows a graphical illustration of the calculated reflection R and the measured reflection $R_{exp}$ as a function of the wavelength λ for the incident angle 0° in a further exemplary embodiment of a reflection-reducing interference layer system according to the invention. The layer system has a total of ten alternating layers and has the following layer construction: 11 H, 51 L, 29 H, 24 L, 149 H, 26 L, 21 H, 86 L, 120 X, 40 L. In this case, the abbreviation H denotes a high refractive index layer composed of $Ta_2O_5$ (n=2.3) and the abbreviation L denotes a low refractive index layer composed of $SiO_2$ (n=1.46). X denotes a nanostructured layer composed of melamine (2,4,6-triamino-1,3,5-triazine).

In order to produce the layer system, the seven alternating oxide layers H and L were deposited onto a glass substrate by means of vapor deposition successively in a vacuum installation (Leybold APS904 type). The melamine layer was then likewise applied in the vacuum chamber by thermal vapor deposition with a thickness of approximately 300 nm. Afterward, the sample was etched in the vacuum installation by means of an ion source (Leybold APS type) at a maximum ion energy of 120 eV with the addition of oxygen as a reactive gas for 200 s. The melamine layer X remaining after this plasma structuring has a total thickness of approximately 120 nm. A further $SiO_2$ layer, serving as a protective layer and having a thickness of approximately 40 nm, was subsequently applied to the structured melamine layer. Consequently, the entire layer system was advantageously produced in a vacuum process.

The graph in FIG. 9 illustrates that, with this layer system, in the wavelength range of approximately 400 nm to approximately 1200 nm, at an incident angle of 0°, a reflection of less than 0.5% can be obtained.

Figure 10:
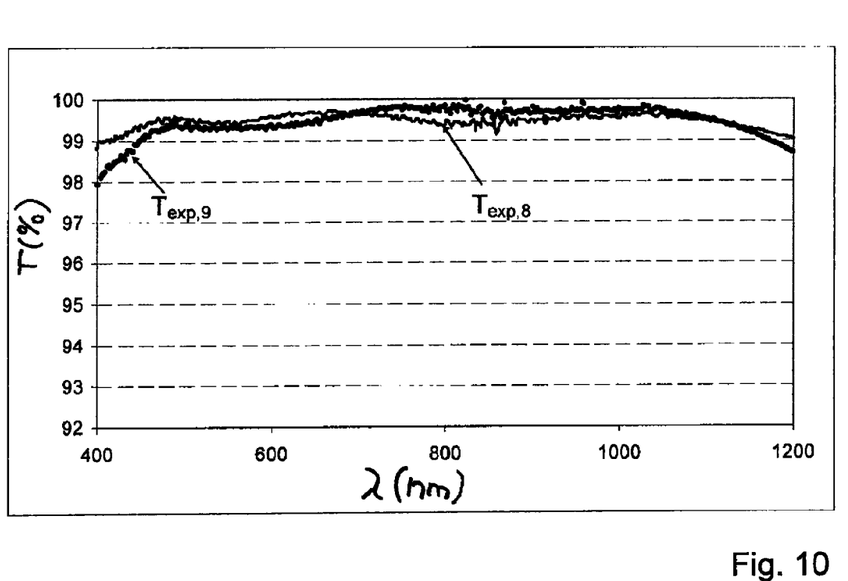
FIG. 10 shows a graphical illustration of the measured transmission $T_{exp,8}$ of the exemplary embodiment from FIG. 8 and the measured transmission $T_{exp,9}$ of the exemplary embodiment from FIG. 9 as a function of the wavelength λ for the incident angle 0°.

FIG. 10 illustrates the measured transmission $T_{exp,8}$ of the exemplary embodiment from FIG. 8 and the measured transmission $T_{exp,9}$ of the exemplary embodiment from FIG. 9. The layer systems of the exemplary embodiments are advantageously highly transparent. In the spectral range of approximately 400 nm to approximately 1200 nm, the transmission $T_{exp,8}$ is more than 99% and the transmission $T_{exp,9}$ is more than 98%.

The invention is not restricted by the description on the basis of the exemplary embodiments. Rather, the invention encompasses any novel feature and also any combination of features, which, in particular, includes any combination of features in the patent claims, even if this feature or this combination itself is not explicitly specified in the patent claims or exemplary embodiments.

What is claimed is:

1. A method for producing a reflection-reducing interference layer system, the method comprising:
    applying at least three alternating layers having different refractive indices to a substrate;
    applying a layer comprising an organic material or an organic-inorganic hybrid material over the alternating layers; and
    plasma etching to form a nanostructure in the layer comprising the organic material or the organic-inorganic hybrid material.

2. The method as claimed in claim 1, wherein the alternating layers and the layer comprising the organic material or the organic-inorganic hybrid material are applied in each case by vacuum coating.

3. The method as claimed in claim 1, wherein, before the nanostructure is formed, a thin layer is applied to the layer comprising the organic material or the organic-inorganic hybrid material.

4. The method as claimed in claim 3, wherein the thin layer is an oxide layer, a nitride layer or a fluoride layer.

5. The method as claimed in claim 3, wherein the thin layer contains silicon oxide, silicon nitride, titanium oxide or magnesium fluoride.

6. The method as claimed in claim 3, wherein the thin layer has an average thickness of 2 nm or less.

7. A method of forming a reflection-reducing interference layer system, the method comprising:

forming at least three alternating layers having different refractive indices; and forming a layer on the alternating layers of the interference layer system, the layer comprising an organic material or an organic-inorganic hybrid material; and forming a nanostructure in the layer thereby forming a nanostructured layer.

8. The method as claimed in claim 7, wherein the nanostructured layer has an effective refractive index n<1.3.

9. The method as claimed in claim 7, wherein forming the nanostructure in the layer comprises performing a plasma etch.

10. The method as claimed in claim 7, wherein forming the nanostructured layer comprises forming a nanostructured layer with a thickness of between 50 nm and 150 nm inclusive.

11. The method as claimed in claim 7, wherein a nanostructure of the nanostructure layer extends from a surface of the nanostructured layer down to a depth of 25 nm or more into the nanostructured layer.

12. The method as claimed in claim 7, wherein the nanostructured layer contains hexamethyldisiloxane (HMDSO), allylamine, allyl alcohol, vilyl acetate, styrene, parylene, Ormocer, polyurethane-containing resist, polyamide, polymethyl methacrylate (PMMA), silicone, pentacene, polytetrafluoroethylene (PTFE), melamine, alpha-NPD, NNB or TNP.

13. The method as claimed in claim 7, wherein the nanostructured layer contains the organic material into which inorganic nanoparticles are embedded.

14. The method as claimed in claim 7, further comprising forming a protective layer over the nanostructured layer.

15. The method as claimed in claim 14, wherein the protective layer comprises an $SiO_2$ layer.

16. The method as claimed in claim 14, wherein the protective layer has a thickness of 50 nm or less.

17. The method as claimed in claim 7, wherein forming at least three alternating layers comprises forming at least five alternating layers.

18. The method as claimed in claim 7, wherein the alternating layers are inorganic layers.

* * * * *